United States Patent
Bansen

[15] 3,705,448
[45] Dec. 12, 1972

[54] BROACH ASSEMBLY

[72] Inventor: Kurt Bansen, 2142 Walter Court, Warren, Mich. 48092

[22] Filed: Sept. 10, 1970

[21] Appl. No.: 70,983

[52] U.S. Cl.....................................29/95.1, 29/105
[51] Int. Cl.............................B26d 1/00, B26d 1/12
[58] Field of Search..29/95.1, 96, 97, 98, 105, 105 A

[56] References Cited

UNITED STATES PATENTS

| | | | |
|---|---|---|---|
| 3,588,976 | 6/1971 | Dupuis et al.................29/95.1 |
| 2,173,074 | 9/1939 | Romaine......................29/95.1 |
| 2,854,734 | 10/1958 | Beck..............................29/96 |
| 3,134,162 | 5/1964 | Emmevich et al..............29/96 |
| 3,378,901 | 4/1968 | Dupuis.....................29/105 X |
| 1,225,552 | 5/1917 | Wvesthoff................29/105 X |
| 3,574,251 | 4/1971 | Corti.........................29/105 X |

FOREIGN PATENTS OR APPLICATIONS 318,815   2/1920   Germany.....................29/105

Primary Examiner—Harrison L. Hinson
Attorney—Hauke, Gifford and Patalidis

[57] ABSTRACT

A broach assembly useful in shaving or skiving operations including a broach block, a cutting blade and means accessible from the cutting blade side of the broach block to mount the blade to the block and to adjust the position of the blade with respect to the block. The adjustment is provided by a pin engageable with the underside of the cutting blade and a screw actuated device accessible from adjacent the blade for moving the pin vertically beneath the blade.

4 Claims, 5 Drawing Figures

PATENTED DEC 12 1972 3,705,448

INVENTOR
KURT BANSEN

INVENTOR
KURT BANSEN

BROACH ASSEMBLY

BACKGROUND OF THE INVENTION

1 Field of the Invention

The present invention relates generally to a broach assembly and more particularly to a new means for adjustably mounting the cutting blade to the broach block in such an assembly.

2. Description of the Prior Art

Shaving or skiving broaches are used to reduce a workpiece to either a finished size or to a shape or size where other types of machining operations, such as grinding for instance, can be used to produce a finished product. Such broaches are often quite large, using a large number of blades, so that the ability to quickly insert new or sharpened blades when the blades being used become dull is important. Since the blades are generally quite long, proper positioning of the blades with respect to the block can be difficult since not only the proper height of the cutting edge from the broach block surface must be provided, but the cutting edge must be positioned parallel with respect to that surface.

Heretofore, such blades have been mounted to broach blocks in a number of ways. A common method has been to provide an elongated slot in the upper face of the broach block which receives the blade. Shim stock is then used to position the blade to as near as possible to the proper height. The blade is then clamped to the block, usually by a wedge member which is either hammered into place or which is mounted to the block by screws. The cutting blade is then finish ground while mounted to the block to achieve proper height and parallelism. This is a rather expensive and difficult process and one which requires that the operation be completely shut down while new blades are being inserted in the block.

Previous attempts have been made to provide such an assembly with a blade which can be adjusted relative to the broach block so that the blade can be sharpened, positioned in the block and then adjusted to the proper height and parallelism through the use of the adjustment means. This, of course, eliminates the step of finish grinding after the cutting blade has been clamped into position, and thus substantially reduces the time and expense involved in sharpening or replacing the cutting blades for such assemblies.

The problem encountered with such assemblies as heretofore known, however, has been that the adjustment means comprises a screw mounted in the lower face of the block in a position to engage the underside of the cutting blade. While this kind of arrangement has solved some of the problems of mounting cutting blades in these types of broaching assemblies, adjustment must still be accomplished from the side of the broach block opposite the cutting blades and this requires, in many instances, that the broach block be removed from a holder and be turned upside down to produce the proper adjustment. Because these broach blocks usually hold a number of blades and are quite large and heavy, this is not an entirely satisfactory solution to the problem.

SUMMARY OF THE PRESENT INVENTION

The present invention provides a broach assembly wherein the cutting blade may be easily, rapidly and accurately positioned within the broach block. A slot is provided in the broach block for receiving the blade and clamping means are adapted to be screwed into position to clamp the cutting blade to the broach block. Adjustment is achieved by a screw member extending from the cutting blade side of the broach block and which is engageable with an internally threaded member disposed within the block. A pin is disposed within the block and engages the underside of the cutting blade so that with the clamping means inoperative vertical movement of the pin will produce a positioning of the blade. Means connect the cylindrical member and the pin in such a manner that turning the screw into the cylindrical member produces upward movement of the pin. Gage means are provided on the block, preferably with an indicator, so that the cutting blade can be adjusted up to the proper height by means of the screw, and then the clamping means can be utilized to lock the cutting blade in the proper position.

In this way a cutting blade can be replaced by either a new or sharpened cutting blade and can be adjusted to the proper position without removing the block from its holder and without requiring that the cutting blade be finish ground after it has been clamped into place.

BRIEF DESCRIPTION OF THE DRAWINGS

A clear understanding of the present invention may be had upon reference to the following drawings in which like reference numerals refer to like parts throughout the several views, and in which.

DESCRIPTION OF THE PREFERRED EMBODIMENT

Figure 1:
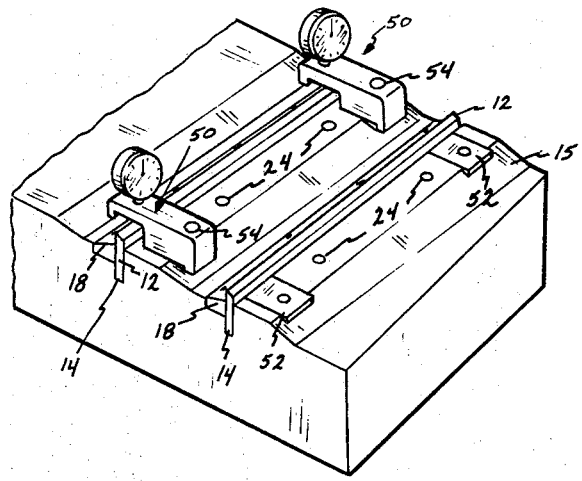
FIG. 1 is a perspective fragmentary view of a broach assembly embodying the present invention.

Now referring to the drawings for a more detailed description of the present invention, a fragmentary portion of the preferred broach assembly is illustrated in FIG. 1 as including a broach block 10 carrying a plurality of cutting blades 12. While it has been preferred to illustrate the broach assembly as carrying but two blades, it is to be understood that such an assembly usually has more blades than this and the machining operation which uses such broach assemblies will generally use three or four assemblies in a line.

Throughout this description, words such as "upper" and "lower" will be used for purposes of clarity only and to describe the relative location of elements as they appear in the drawings. It is to be understood that these words are not intended as words of limitation since it is apparent that the broach assemblies can be used positioned differently than shown in the drawings.

Figure 2:
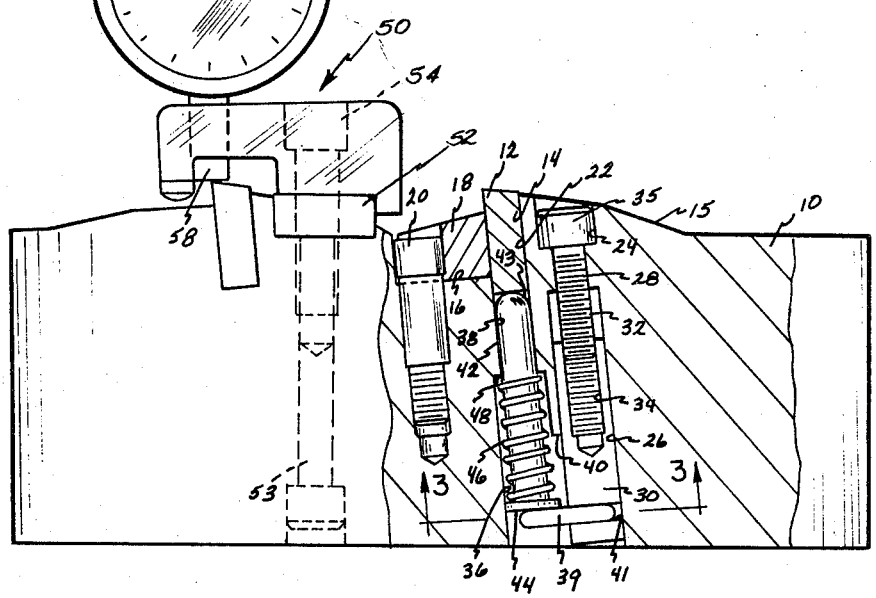
FIG. 2 is an enlarged side elevational view of the assembly shown in FIG. 1 with portions sectioned for purposes of clarity.

As can best be seen in FIG. 2, the broach block 10 is provided with elongated slots 14 formed in the upper or cutting surface 15 of the block 10 and recesses 16 extending laterally from one side of the slot 14 for receiving the cutting blades 12 and an elongated clamp member 18 respectively. The clamp member 18 is mounted in place by several cam head screws 20 which, when tightened, urge the clamp member 18 in the direction of the slot 14 and therefore against the blade 12 to clamp the blade against a face 22 forming one face of the slot 14. This particular mounting for the cutting blades 12 is not an important part of the present invention and is a conventional way of mounting blades of this type to broach assemblies. Other mounting means can be used in the present invention as will become more apparent as the description proceeds.

The means for adjusting the height and the parallelism of the blades 12 will now be described in detail. Cylindrical recesses 24 are formed on the upper or cutting surface 15 of the broach block 10 on the sides of the blades 12 opposite the clamp members 18. This is best illustrated in FIG. 1. As can best be seen in FIG. 2, the recesses 24 communicate and are axially aligned with bores 26 through reduced diameter sections 28.

An internally threaded cylindrical member 30 is disposed within the bore 26 and a screw 32 extends through the recess 24, the reduced diameter section 28 and is received by internal threads 34 formed in the member 30. The reduced diameter section 28 forms a shoulder for retaining the head 35 of the screw 32 within the recess 24.

A second set of bores comprising a lower enlarged diameter bore 36 and a reduced diameter bore 38 are formed in the broach block 10 generally parallel to the bores 26 and intersect the recess 14. As can best be seen in Fig. 3, a cross member 39 is carried in a bore 41 in the lower end of the cylindrical member 30 and extends into the bore 36 through an elongated opening 40 formed between the lower ends of the bores 26 and 36.

The cross member 39 in the embodiment shown comprises a pin extending from the bore 41 formed in the cylindrical member 30, but it is apparent that it could take other forms as well.

Rotation of the screw 32 then produces movement of the cylindrical member 30 in the bore 26 in an axial direction which depends upon the direction of the rotation of the screw 32 to cause the cross member 39 to be moved upwardly and downwardly in the bore 36.

A pin member 42 rests upon the upper edge of the cross member 39 and has a diameter slightly less than the diameter of the bore 38. The pin member 42 extends through the bore 38 and abuts against the bottom of the cutting blade 12. An enlarged diameter lower base 44 rests upon the cross member 39. A compression spring 46 is interposed between the base 44 and a shoulder 48 formed in the broach block 10 by the difference in diameters between the two bores 36 and 38 and urges the pin member 42 into engagement with the cross member 39. Thus, vertical movement of the cylindrical member 30, as produced by rotation of the screw 32, produces a corresponding movement of the pin member 42 through the cross member 39, and thus provides a means for adjusting the position of the blades 12 in the slots 14. This adjustment means comprises a positive mechanical upward adjustment of the blades 12 and in effect produces a lower positive stop against which the blade can be lowered. The spring 46 does nothing more than aid in returning the pin member 42 to the lower position when the screw 32 is loosened.

The broach assembly of the present invention also preferably includes a set of gage members 50 longitudinally spaced along the length of the blades 12 and which can be mounted to the broach block 10 by means of series of pads of the cylindrical member 30, as produced by rotation of the screw 32, produces a corresponding movement of the pin member 42 through the cross member 39, and thus provides a means for adjusting the position of the blades 12 in the slots 14. This adjustment means comprises a positive mechanical upward adjustment of the blades 12 and in effect produces a lower positive stop against which the blade can be lowered. The spring 46 does nothing more than aid in returning the pin member 42 to the lower position when the screw 32 is loosened.

The broach assembly of the present invention also preferably includes a set of gage members 50 longitudinally spaced along the length of the blades 12 and which can be mounted to the broach block 10 by means of a series of pads 52 provided adjacent the recesses 24, as can best be seen in FIG. 1.

Referring again to FIG. 2, the pads 52 are secured in any convenient manner to the upper face of the broach block 10, as by screws 53 extending upwardly from the underside of the block 10, and are internally threaded to receive a fastener 54. A holder 56 is mounted to the pad 52 by the fastener 54 and extends out over the blade 14 to carry a gaging member 58 in a position to be engaged by the upper edge of the blade 12. The gaging member is of conventional construction and is connected with a dial indicator 60 such that vertical movement of the member 58 produces an indication on the indicator 60. The top surface 53 is the reference surface for the gage members 50. Thus, it is apparent that the blade height and parallelism can be set with the use of the gage members 50 and by adjustment of the screw 32 to bring the blade 12 to the proper height as indicated by the indicator 60. Once the blades 12 are at the proper height 52 provided adjacent the recesses 24, as can best be seen in FIG. 1.

Referring again to FIG. 2, the pads 52 are secured in any convenient manner to the upper face of the broach block 10, as by screws 53 extending upwardly from the underside of the block 10, and are internally threaded to receive a fastener 54. A holder 56 is mounted to the pad 52 by the fastener 54 and extends out over the blade 14 to carry a gaging member 58 in a position to be engaged by the upper edge of the blade 12. The gaging member is of conventional construction and is connected with a dial indicator 60 such that vertical movement of the member 58 produces an indication on the indicator 60. The top surface 53 is the reference surface for the gage members 50. Thus, it is apparent that the blade height and parallelism can be set with the use of the gage members 50 and by adjustment of the screw 32 to bring the blade 12 to the proper height as indicated by the indicator 60. Once the blades 12 are at the proper height and position, the screws 20 are then tightened to clamp the blades 12 in place.

Figure 3:
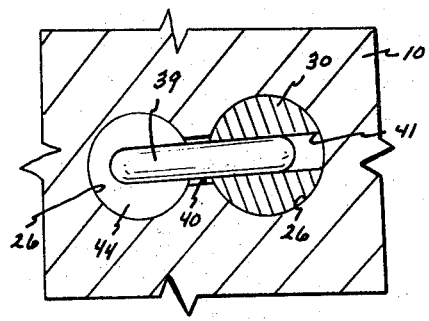
FIG. 3 is a transverse cross-sectional view taken substantially on line 3—3 of Fig. 2 and enlarged somewhat for purposes of clarity.
Figure 4:
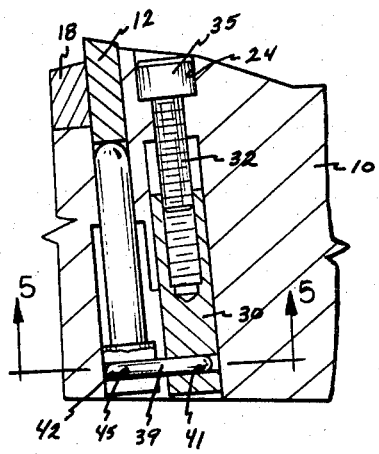
FIG. 4 is a fragmentary cross-sectional view of another preferred embodiment of the present invention.
Figure 5:
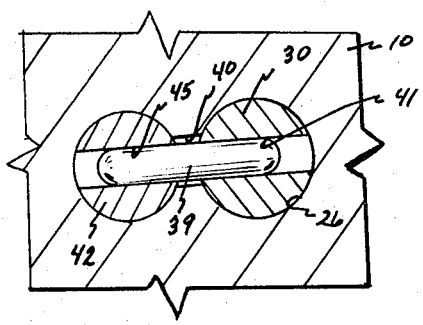
FIG. 5 is a transverse cross-sectional view taken substantially on line 5—5 of Fig. 4 and enlarged somewhat for purposes of clarity.

FIGS. 4 and 5 illustrate another preferred embodiment similar to the embodiment of FIGS. 2 and 3, but in which the spring 46 urging the pin 43 into engagement with the cross member 39 has been eliminated. To insure that the pin 43 will move vertically in both directions, the cross member 39 extends through a bore 45 formed in the lower portion of the pin 42. This provides a positive mechanical connection between the screw 32 and the pin 42, regardless of the direction of rotation of the screw 32.

The screws 32 are preferably micro screws so that each complete turn results in 0.0025 of inch movement of the blade. This permits the blade to be accurately positioned.

It is apparent that a broach assembly has been described in which mounting the cutting blades in the proper position is much easier to accomplish than in previous constructions. Because there is a positive driving connection between the adjustment means and the blade 12, a proper positioning of the blade is assured.

It is also apparent that although I have described but one embodiment of my invention, many changes can be made therein without departing from the spirit of the invention.

I claim:

1. A broach assembly including a broach block, and a cutting blade,
   - a screw extending into said block from one face thereof,
   - a pin axially slidably mounted in said block adjacent said screw and in a position to engage the inner edge of said blade to move said blade in a direction away from said block,
   - means connecting said pin and said screw so that said pin is movable toward and away from said blade depending upon the direction of rotation of said screw whereby said pin provides a stop for said blade permitting the position of said blade to be adjusted with respect to said block, and
   - means for locking said blade in said adjusted position.

2. The assembly as defined in claim 1 and in which said connecting means comprises a cylindrical member axially movably mounted in said block and axially movable thereby in a direction depending upon the direction of rotation of said screw and a member extending transversely between said cylindrical member and said pin and moving said pin with said cylindrical member.

3. The assembly as defined in claim 1 and including spring means urging said pin in a direction away from said blade.

4. A broach assembly comprising:
   - a broach block having a face and a recess formed in said face;
   - a blade adapted to be received within said recess;
   - a screw member accessible from said face, a pin axially movably mounted in said block to extend into said recess in a direction substantially perpendicular to said face and means connecting said screw member and said pin so that upon rotation of said screw said pin is moved into or out of said recess in a direction of rotation of said screw whereby said pin provides a stop limiting the position of said blade in said recess and
   - means for locking said blade in said recess.

* * * * *